Jan. 27. 1925. 1,524,626
N. E. METHLIN
MEANS OF MOUNTING ROLLER BEARINGS FOR THE CRANK SHAFTS
OF EXPLOSION ENGINES
Filed May 20, 1924
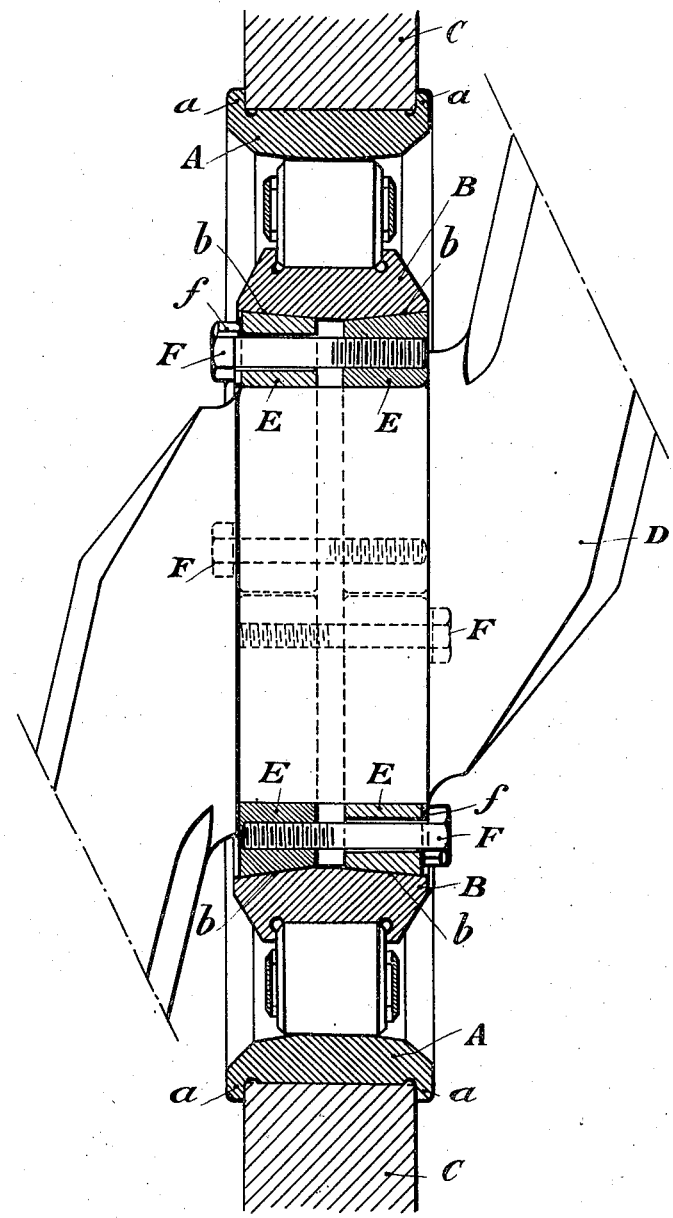

Patented Jan. 27, 1925.

1,524,626

UNITED STATES PATENT OFFICE.

NICOLAS EMILIEN METHLIN, OF PARIS, FRANCE, ASSIGNOR TO SCHNEIDER & CIE., OF PARIS, FRANCE, A LIMITED JOINT STOCK COMPANY OF FRANCE.

MEANS OF MOUNTING ROLLER BEARINGS FOR THE CRANK SHAFTS OF EXPLOSION ENGINES.

Application filed May 20, 1924. Serial No. 714,753.

*To all whom it may concern:*

Be it known that I, NICOLAS EMILIEN METHLIN, a citizen of the Republic of France, resident of Paris, France, have invented new and useful Improvements in the Means of Mounting Roller Bearings for the Crank Shafts of Explosive Engines, which are fully set forth in the following specification.

This invention has for its object to provide an improved means of mounting roller bearings for the crank shaft journals in the crank case of an explosion engine.

Hitherto roller bearings for crank shafts have been mounted by using roller bearings having an internal diameter sufficient to allow of the passage of the crank arms of the crank shaft, and interposing between the bearing and the crank shaft two half-rings having a width greater than that of the bearing, said two half-rings being assembled by two bolts; the increase in the width being necessary in order to accommodate the assembling bolts. That method of mounting has the drawbacks of increasing considerably the length of the crank shaft journal, and of not assuring a perfectly rigid fixture of the inner roller race of the bearing upon the crank shaft.

The improved method of mounting that forms the object of the present invention does away with the above stated drawbacks.

A practical form of the improved means is illustrated by way of example in the accompanying drawing which is a sectional elevation taken along the axis of the roller bearing.

The roller bearing proper is constituted in the usual manner, but the outer roller race A of the bearing is made with side rims *a* which serve to hold it rigidly in place in the crank case; this latter being formed in two parts C.

The bore of the inner roller race B is constituted by two truncated conical surfaces *b*, *b* connected together at their small ends. The smallest diameter of this double truncated conical bore is made such as to allow the bearing to pass easily over the crank arms D of the crank shaft.

The parts are assembled in the following manner:

First the roller bearing is placed into position, and then there are inserted in succession four half-rings E, E, E, E bored internally to a cylindrical shape to fit the diameter of the crank shaft journal, and externally to a conical shape corresponding to the double truncated conical bore *b*, *b* of the inner roller race B.

By means of bolts F, which act to force the two half-rings E, E facing each other to move the nearer towards each other, perfect contact is effected between the crank shaft and the said half-rings, on the one hand, and between these half-rings and the the roller bearing on the other hand.

The bolts are locked in any suitable manner for instance by means of a sheet steel plate *f* having its edges turned up against the heads of the bolts.

Having now particularly described and ascertained the nature of my said invention and in what manner the same is to be performed, I declare that what I claim is:

In a roller bearing for crank shaft journals, the combination of an inner roller race having two inner truncated conical surfaces connected at their smaller ends, with spacing devices consisting of four half rings, two on either side, the exterior annular surfaces of said rings being beveled to the same angle as the truncated conical surfaces of the race, and clamping bolts parallel to the axis of the crank-shaft journal clamping together the oppositely disposed members of said rings.

In testimony whereof I have signed this specification.

NICOLAS EMILIEN METHLIN

Witnesses:
ANDRÉ MOSTICKER,
LOUIS GARDET.